(12) United States Patent
Funakoshi

(10) Patent No.: US 11,024,330 B2
(45) Date of Patent: Jun. 1, 2021

(54) SIGNAL PROCESSING APPARATUS, SIGNAL PROCESSING METHOD, AND STORAGE MEDIUM

(71) Applicant: CANON KABUSHIKI KAISHA, Tokyo (JP)

(72) Inventor: Masanobu Funakoshi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 133 days.

(21) Appl. No.: 16/385,451

(22) Filed: Apr. 16, 2019

(65) Prior Publication Data

US 2019/0348066 A1  Nov. 14, 2019

(30) Foreign Application Priority Data

May 9, 2018 (JP) .............................. JP2018-090689

(51) Int. Cl.
*G10L 25/78* (2013.01)
*H04R 1/40* (2006.01)
*G10L 21/02* (2013.01)

(52) U.S. Cl.
CPC .............. *G10L 25/78* (2013.01); *G10L 21/02* (2013.01); *H04R 1/406* (2013.01)

(58) Field of Classification Search
CPC ....... G10L 15/00; G10L 15/005; G10L 15/08; G10L 15/083; G10L 2015/088; G10L 15/10; G10L 15/18; G10L 15/19; G10L 15/20; G10L 21/02; G10L 2021/2087; G10L 2021/02166; G10L 25/51;
(Continued)

(56) References Cited

U.S. PATENT DOCUMENTS

| 9,622,012 B2 | 4/2017 | Funakoshi |
| 9,648,411 B2 | 5/2017 | Funakoshi |
| 10,388,297 B2 * | 8/2019 | Di Censo .................. H04S 7/30 |

(Continued)

FOREIGN PATENT DOCUMENTS

JP  2017126888 A  7/2017

OTHER PUBLICATIONS

N. Yousefian, K. Kokkinakis and P. C. Loizou, "A coherence-based algorithm for noise reduction in dual-microphone applications," 2010 18th European Signal Processing Conference, Aalborg, 2010, pp. 1904-1908 (Year: 2010).*

(Continued)

*Primary Examiner* — Paras D Shah
*Assistant Examiner* — Sean E Serraguard
(74) *Attorney, Agent, or Firm* — Carter, DeLuca & Farrell LLP

(57) ABSTRACT

A signal processing apparatus includes a detection unit configured to perform a voice detection process on each of a plurality of audio signals captured by a plurality of microphones arranged at mutually different positions, a determination unit configured to determine a degree of similarity between two or more of the plurality of audio signals in which voice is detected by the detection unit, and a suppression unit configured to perform a process of suppressing the voice contained in at least one of the two or more audio signals, in response to a determination that the degree of similarity between the two or more audio signals is less than a threshold by the determination unit.

20 Claims, 16 Drawing Sheets

(58) Field of Classification Search
CPC ... G10L 25/78; G10L 25/84; G10L 2025/937; H04S 2400/15; H04S 2420/07; H04R 1/406
See application file for complete search history.

(56) References Cited

U.S. PATENT DOCUMENTS

| | | | | |
|---|---|---|---|---|
| 2011/0288858 | A1* | 11/2011 | Gay | G10L 21/028 704/226 |
| 2012/0046940 | A1* | 2/2012 | Tsujikawa | G10L 21/0272 704/200 |
| 2013/0044893 | A1* | 2/2013 | Mauchly | H04N 7/15 381/92 |
| 2014/0180685 | A1* | 6/2014 | Ono | G10L 21/0272 704/233 |
| 2017/0351485 | A1* | 12/2017 | Kohler | A63F 13/25 |
| 2018/0233158 | A1* | 8/2018 | Ray | G10L 21/0208 |
| 2018/0336001 | A1* | 11/2018 | Abuelsaad | G10L 21/0272 |

OTHER PUBLICATIONS

McCowan, I. A., Microphone Arrays: A Tutorial. [online], Apr. 2001 [retrieved on May 17, 2017]. Retrieved from the Internet: <URL: https://web.archive.org/web/20170517075958/http://www.aplu.ch/home/download/microphone_arRay.pdf> (Year: 2017).*

R. L. Bouquin and G. Faucon, "Using the coherence function for noise reduction," IEE Proceedings, vol. 139, pp. 276-280, Jun. 1992 (Year: 1992).*

* cited by examiner

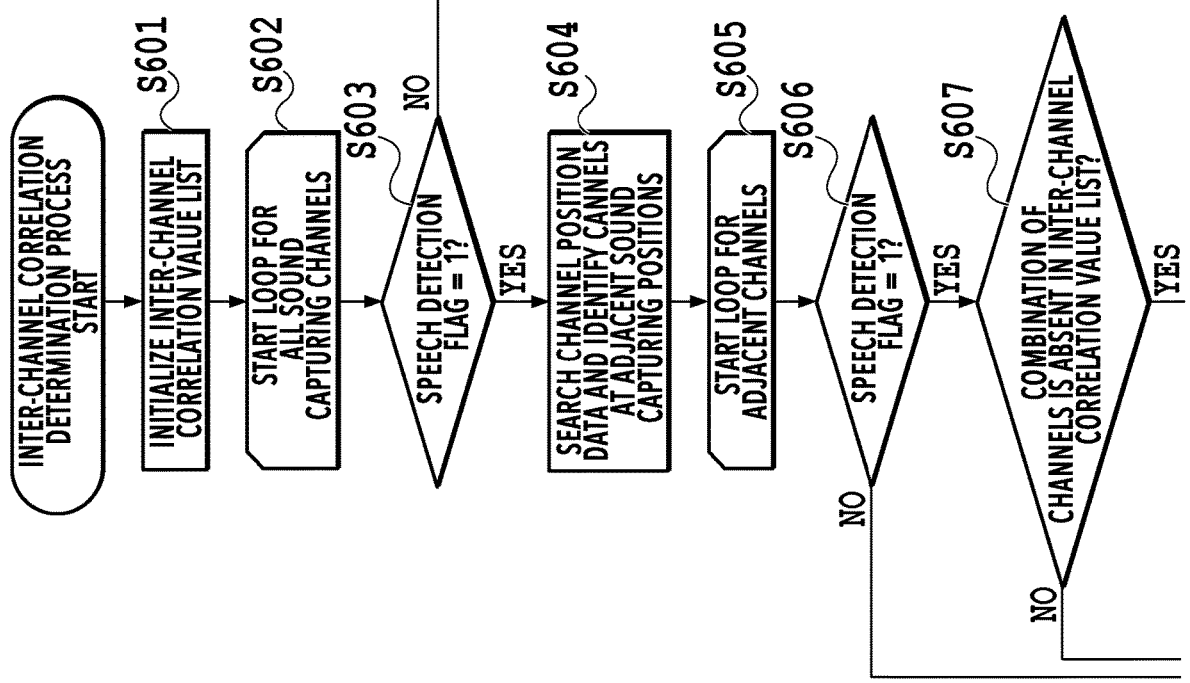

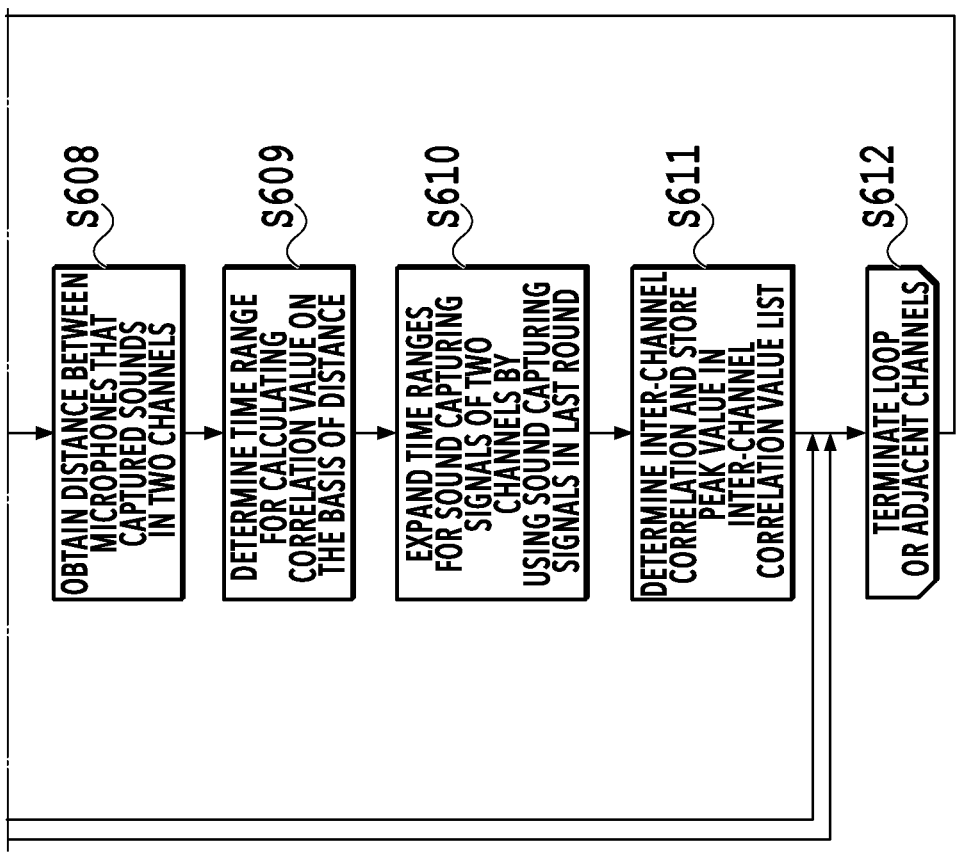

US 11,024,330 B2

SIGNAL PROCESSING APPARATUS, SIGNAL PROCESSING METHOD, AND STORAGE MEDIUM

BACKGROUND OF THE INVENTION

Field of the Invention

The present invention relates to a technique for processing audio signals on the basis of sound capturing at a plurality of sound capturing positions.

Description of the Related Art

In a case of capturing sounds in a public place for the purpose of broadcasting, recording, or the like, it is necessary to protect private speech, such as personal conversations, from being exposed to the public. To do this, there is a technique that detects private speech and performs a masking process on it.

Japanese Patent Laid-Open No. 2017-126888 (hereinafter referred to as Document 1) discloses a technique that performs a control process such as masking on speech which is mixed with speech uttered in a privacy protection area and directed toward a target area.

For example, in a case of capturing and reproducing sounds in an event such as a game at a venue, e.g. a sports venue or the like, the sounds of shouts such as supporters' cheers, hoots, and songs are captured near spectator stands to provide the sense of presence. In such a venue, private conversations are also made at a lot of spots in the spectator stands. This means that the sounds of shouts, which should be reproduced, and private conversations, which should not be reproduced, are made at the same area. Thus, it is impossible to determine whether a sound is private speech or not on the basis of where the sound is produced, as is done in the technique of Document 1. Note that similar problems occur also in cases where the sound capturing location is a concert venue or the like.

SUMMARY OF THE INVENTION

A signal processing apparatus according to an aspect of the present invention comprises: a detection unit configured to perform a voice detection process on each of a plurality of audio signals captured by a plurality of microphones arranged at mutually different positions; a determination unit configured to determine a degree of similarity between two or more of the plurality of audio signals in which voice is detected by the detection unit; and a suppression unit configured to perform a process of suppressing the voice contained in at least one of the two or more audio signals, in response to a determination that the degree of similarity between the two or more audio signals is less than a threshold by the determination unit.

Further features of the present invention will become apparent from the following description of exemplary embodiments with reference to the attached drawings.

BRIEF DESCRIPTION OF THE DRAWINGS

FIG. 6 is a diagram showing the relationship of FIGS. 6A and 6B;

FIGS. 6A and 6B are totally a flowchart illustrating an inter-channel correlation determination process;

FIG. 11 is a diagram showing the relationship of FIGS. 11A through 11C;

DESCRIPTION OF THE EMBODIMENTS

Embodiments of the present invention will be described below with reference to the drawings. Note that the following embodiments do not limit the present invention, and not all the combinations of the features described in these embodiments are necessarily essential for a solution provided by the present invention. Meanwhile, the description will be given with the same reference sign given to identical components.

Embodiment 1

<Configuration of Signal Processing Apparatus>

Figure 1:
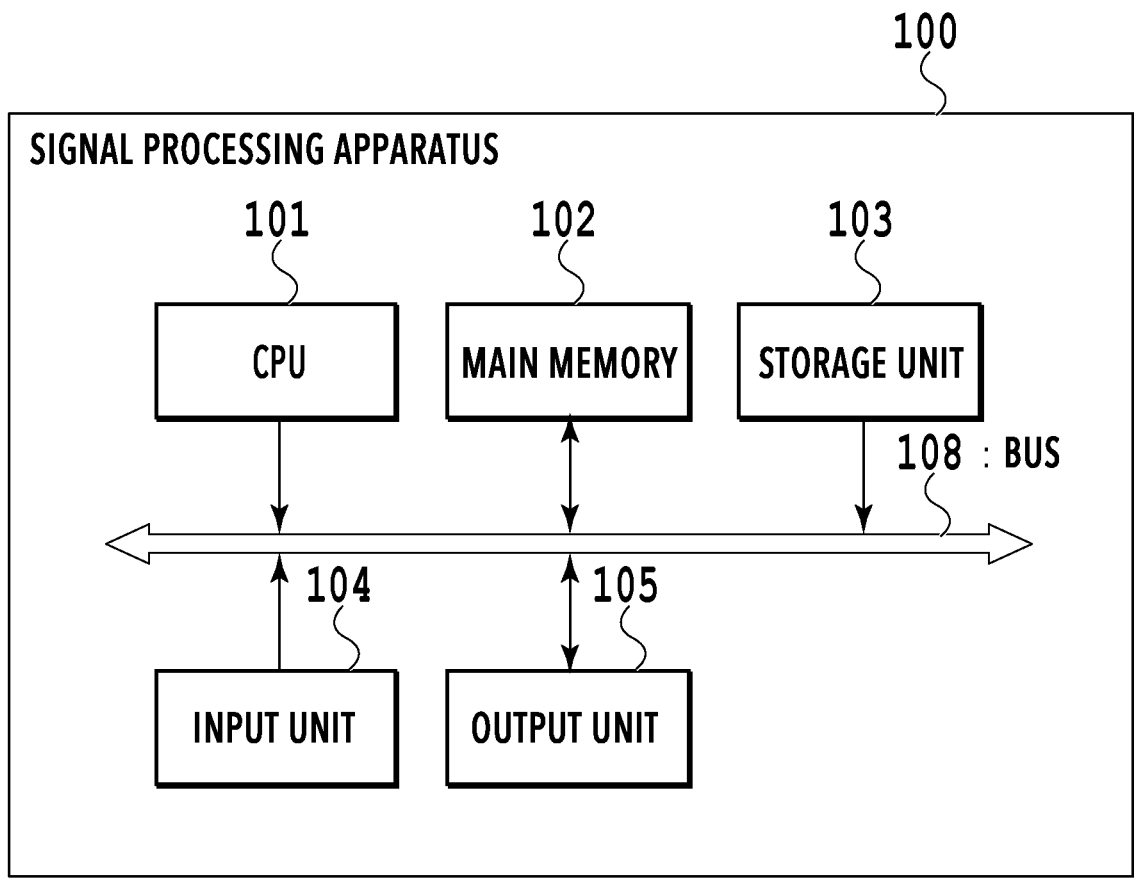
FIG. 1 is a block diagram illustrating an example of a signal processing apparatus.

FIG. 1 is a diagram illustrating an example of the configuration of a signal processing apparatus 100 in this embodiment. The signal processing apparatus 100, illustrated in FIG. 1, includes a CPU 101, a main memory 102, a storage unit 103, an input unit 104, and an output unit 105, and these components are connected to each other through a bus 108. The CPU 101 is an arithmetic processing apparatus that takes overall control of the signal processing apparatus 100 and performs various processes by executing various programs stored in the storage unit 103 and so on. The main memory 102 temporarily stores data, parameters, and so on to be used in various processes and also provides a work area to the CPU 101. The storage unit 103 is a high-capacity storage apparatus that stores various programs and various pieces of data. A non-volatile memory, e.g. a hard disk drive, a silicon disk, or the like is used as the storage unit 103. The input unit 104 receives sound capturing signals captured by microphones or the like. The output unit 105 outputs audio signals subjected to signal processing.

<System Configuration Diagram>

Figure 2:
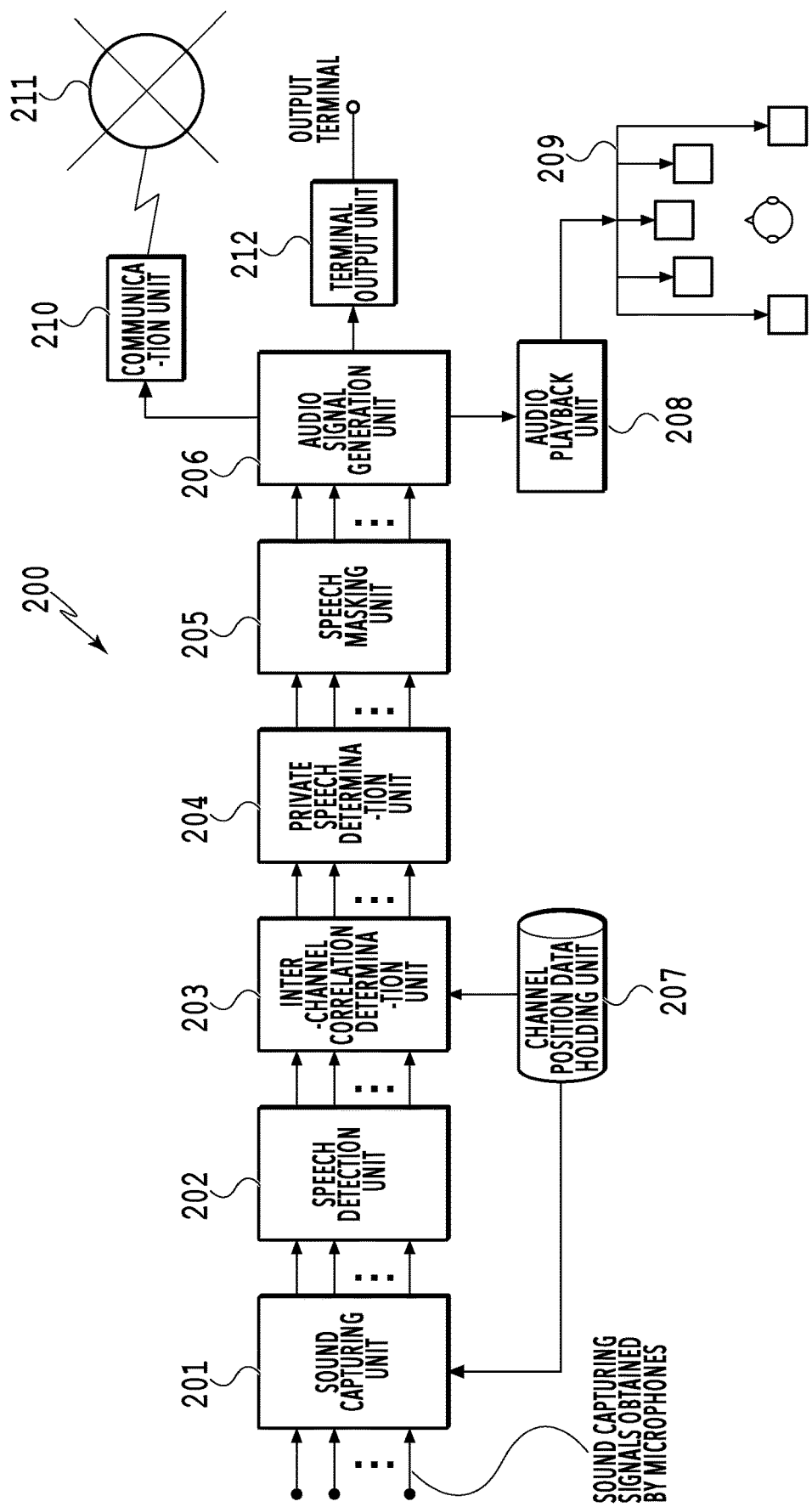
FIG. 2 is a block diagram of a signal processing system.

FIG. 2 is a block diagram of a signal processing system 200 that performs the signal processing in this embodiment. The signal processing apparatus 100, illustrated in FIG. 1, is an apparatus that performs at least part of the processing by the signal processing system 200, illustrated in FIG. 2.

The signal processing system 200 includes a sound capturing unit 201, a speech detection unit 202, an inter-channel correlation determination unit 203, a private speech determination unit 204, a speech masking unit 205, an audio signal generation unit 206, and a channel position data holding unit 207. The signal processing system 200 further includes an audio playback unit 208, a speaker array 209, a communication unit 210, and a terminal output unit 212. Note that in this embodiment, "speech" refers to the sound of human voice, and "audio" covers sounds other than speech.

In this embodiment, the CPU 101 in FIG. 1 functions as the speech detection unit 202, the inter-channel correlation determination unit 203, the private speech determination unit 204, the speech masking unit 205, and the audio signal generation unit 206 by executing a predetermined program. The input unit 104 in FIG. 1 functions as the speech detection unit 202 and receives data containing sound capturing signals captured by the sound capturing unit 201. The storage unit 103 in FIG. 1 functions as the channel position data holding unit 207. The output unit 105 in FIG. 1 functions as the audio playback unit 208, the terminal output unit 212, and the communication unit 210. Note that the association between the signal processing apparatus 100 and the signal processing system 200 is not limited to the above manner but they may be associated in various other manners. Also, the signal processing system illustrated in FIG. 2 is a mere example. Other constituent components may further be included. Also, any of the audio playback unit 208, the communication unit 210, and the terminal output unit 212 do not have to be included, and the output unit 105 may be configured to output signals subjected to the signal processing to an external storage apparatus not illustrated. Each constituent component will be described below.

The sound capturing unit 201 amplifies sound capturing signals captured by a plurality of microphones installed near spectator stands in a sound capturing target venue as appropriate, converts them into digital signals on a channel-by-channel basis, and transmits them to the speech detection unit 202. In this embodiment, a different channel is allocated for each microphone. In the mode illustrated here, a single sound capturing unit 201 amplifies the sound capturing signals captured by the microphones and transmits them to the speech detection unit 202. However, as many sound capturing units 201 as the microphones may be provided.

Figure 3:
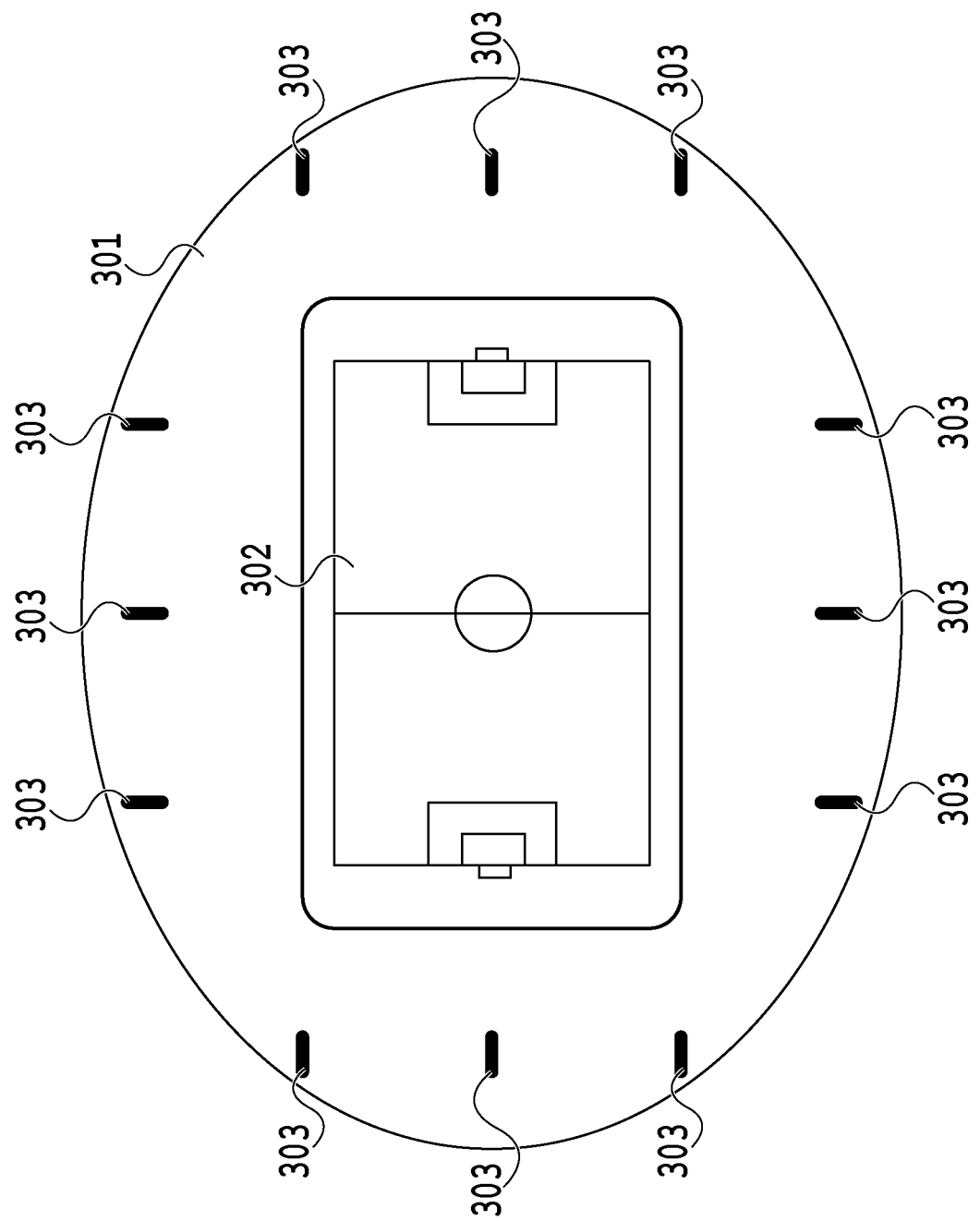
FIG. 3 is a schematic diagram illustrating how sound capturing microphones are installed in a sports venue.

FIG. 3 is a schematic diagram illustrating how microphones for capturing shouts are installed in a soccer venue. An example installation of microphones for capturing shouts in a sports venue will be described using FIG. 3. FIG. 3 illustrates a spectator stand area 301, a sports ground (field) 302, and a plurality of microphones 303. As illustrated in FIG. 3, in this embodiment, the plurality of microphones 303 are installed at predetermined intervals so that they can evenly capture the sound of the entire spectator stand area 301. Instead of being installed all around the spectator stand area 301, the plurality of microphones 303 may be installed at part of the spectator stand area 301. Also, the interval between each pair of adjacent microphones 303 does not have to be the same. Further, a plurality of types of microphones with different characteristics may be included in the plurality of installed microphones 303. Furthermore, the location where the microphones 303 are installed is not limited to a sports venue and may be a concert venue or the like, for example.

Referring back to FIG. 2, constituent components will be briefly described below. Detailed description will be given later. The speech detection unit 202 performs a process of detecting a speech signal of human voice from the sound capturing signal of each channel received from the sound capturing unit 201. The inter-channel correlation determination unit 203 determines the degree of similarity (correlation value) between channels whose microphone installation positions are near each other. The private speech determination unit 204 determines, for each sound capturing signal channel, whether private speech is contained in the sound capturing signal channel. Private speech in this embodiment is, for example, the sound of a conversation between spectators and represents an example of sounds to be suppressed during playback. The speech masking unit 205 performs a speech masking process on the sound capturing signal of any channel determined to contain private speech by the private speech determination unit 204. The sound of a conversation between a small number of people is relatively quiet voices uttered at a particular spot. Thus, by suppressing voice contained in the sound capturing signal of one microphone but not contained in the sound capturing signals of the other microphones, it is possible to suppress private speech. Details of the private speech determination process will be described later. The audio signal generation unit 206 uses at least the sound capturing signal of the channel subjected to the private speech masking by the speech masking unit 205 to generate an audio signal in a preset audio output format such as a 2-ch stereo or 5.1-ch surround format.

The channel position data holding unit 207 holds the coordinates of the sound capturing positions of the sound capturing signal channels, that is, the coordinates of the positions at which are installed the microphones for capturing the sound capturing signals of the respective channels. The channel position data is outputted to the sound capturing unit 201 and the inter-channel correlation determination unit 203.

The audio playback unit 208 amplifies the audio signal generated by the audio signal generation unit 206 as appropriate, converts it into an analog signal, and outputs it to the speaker array 209, which supports the predefined audio output format. The speaker array 209 converts the analog audio signal outputted from the audio playback unit 208 into sounds and outputs them from the individual speakers constituting the array. The communication unit 210 outputs the audio signal outputted from the audio signal generation unit 206 to the outside through a communication network 211. The communication network 211 is the Internet, a general telephone line, or the like. In this embodiment, the audio signal can be outputted to an apparatus outside the system through the communication network 211. The terminal output unit 212 outputs the audio signal generated by the audio signal generation unit 206 to an external device (not illustrated) connected to an output terminal.

In the example described, these constituent components are implemented by the CPU 101. Note however that the present invention is not limited to this example. The constituent components may be implemented by hardware such as an ASIC or an electronic circuit and connected to the CPU 101 through a control bus, and the CPU 101 may take overall control of their operations by using command instructions. For example, the signal processing apparatus 100 may include one or more dedicated pieces of hardware or graphics processing units (GPUs) different from the CPU 101. Then, the GPUs or the dedicated hardware may perform at least part of the processing by the CPU 101. Examples of the dedicated hardware include a digital signal processor (DSP) as well as an ASIC.

<Flowchart>

Next, a process of determining whether private speech is contained and, if any, performing speech masking on the private speech with the configuration illustrated in FIG. 2 will be described along a flowchart.

Figure 4:
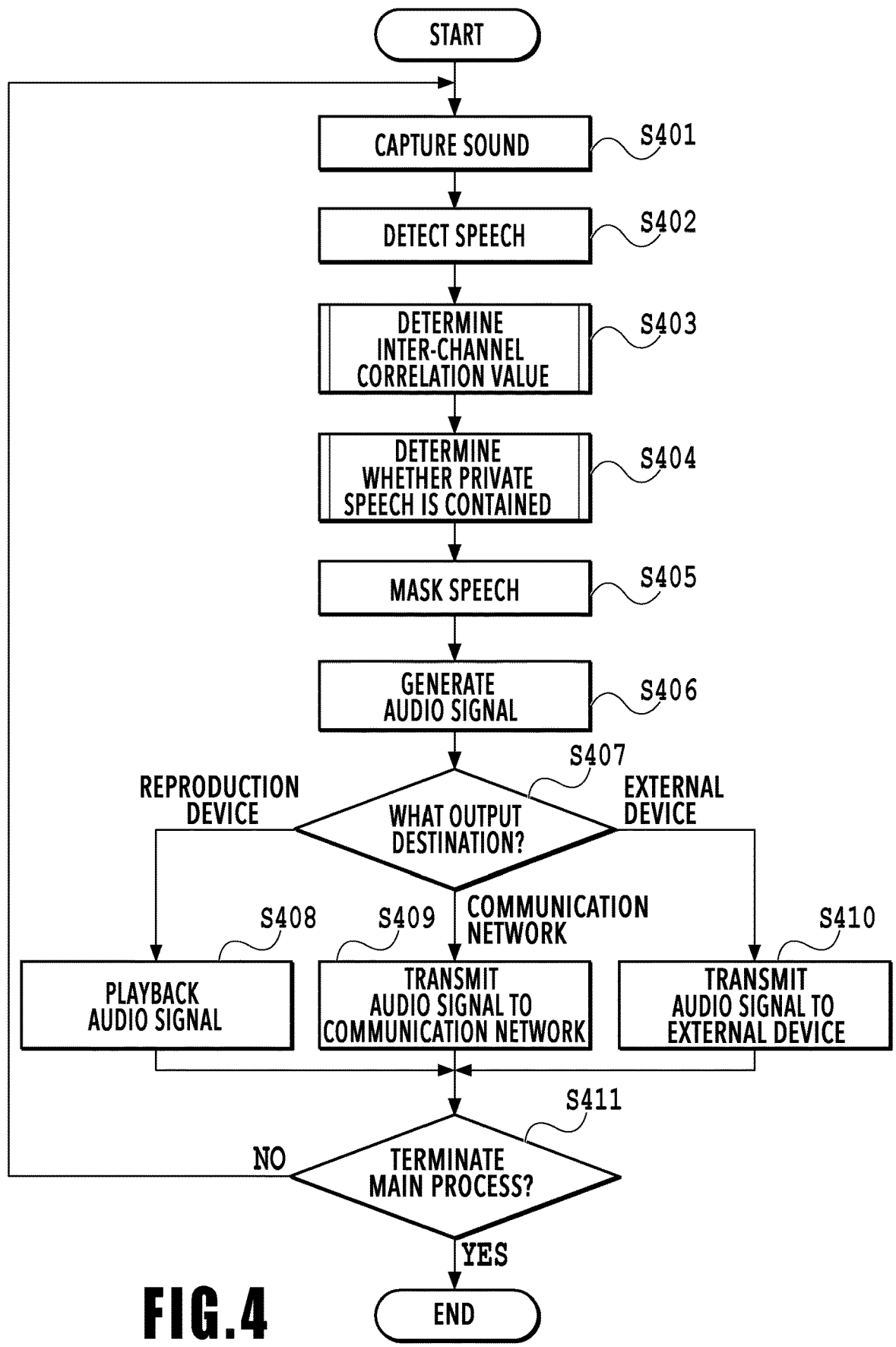
FIG. 4 is a flowchart illustrating signal processing.

FIG. 4 is a diagram illustrating an example flowchart of the signal processing in this embodiment. Meanwhile, the symbol "S" in the description of each process means a step in the flowchart.

In S401, each microphone 303, installed near spectator stands, captures sounds for a given length of time determined in advance. The sound capturing unit 201 amplifies the analog audio signal captured by each microphone 303 as appropriate and converts it into a digital signal. The sound capturing unit 201 generates a piece of captured sound channel information on each channel and transmits the piece of captured sound channel information on each channel to the speech detection unit 202. Here, a piece of captured sound channel information refers to a data structure in which the sound capturing data and metadata associated with it are gathered.

Figure 5:
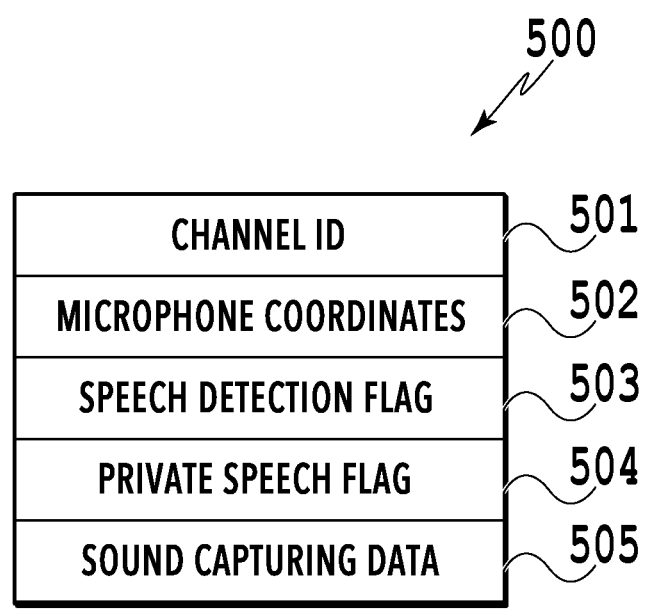
FIG. 5 is a schematic diagram illustrating the data structure of a piece of captured sound channel information.

FIG. 5 is a schematic diagram illustrating the data structure of a piece of captured sound channel information 500 in this embodiment. As illustrated in FIG. 5, a piece of captured sound channel information 500 contains a channel ID 501, microphone coordinates 502, a speech detection flag 503, a private speech flag 504, and sound capturing data 505. The channel ID 501 is a number identifying the channel of the sound capturing signal and corresponding to one of the microphones 303 that has performed the sound capturing. The microphone coordinates 502 store the coordinates at which is installed the microphone 303 that has captured the channel signal identified by the channel ID 501. The microphone coordinates 502 store coordinates based on the channel position data held in the channel position data holding unit 207. The speech detection flag 503 is a flag indicating whether speech is contained in the channel identified by the channel ID 501. The result of the speech detection by the speech detection unit 202 is inputted as the speech detection flag 503. An initial value is inputted in a state where the process by the speech detection unit 202 is yet to be performed. The private speech flag 504 is a flag indicating whether the speech contained in the channel identified by the channel ID 501 is private speech. The result of the determination by the private speech determination unit 204 is inputted as the private speech flag 504. An initial value is inputted in a state where the process by the private speech determination unit 204 is yet to be performed. The sound capturing data 505 stores the actual sound capturing signal of the channel identified by the channel ID 501.

In S401, the sound capturing unit 201 stores the channel ID 501, the microphone coordinates 502, and the sound capturing data 505 in the data structure of the piece of captured sound channel information 500 on each channel. "0" is set as the initial values of the speech detection flag 503 and the private speech flag 504. The sound capturing unit 201 outputs the piece of captured sound channel information 500 on each channel to the speech detection unit 202. In the example described in this embodiment, the sound capturing unit 201 outputs data in the data format of the captured sound channel information 500 to the speech detection unit 202. Note however that the present invention is not limited to this example. The sound capturing unit 201 may output only the sound capturing data to the speech detection unit 202. The speech detection unit 202 may then perform its subsequent process by using the data format of the captured sound channel information 500. In this case, the speech detection unit 202 may be configured to obtain the information on the channel ID 501 and microphone coordinates 502 of each sound capturing unit 201. Also, the data format of the captured sound channel information 500 illustrated in FIG. 5 is a mere example and the data format is not limited to this.

In S402, the speech detection unit 202 analyzes the sound capturing data 505 contained in the piece of captured sound channel information 500 on each channel. In this way, the speech detection unit 202 can detect whether speech data (data of a human voice sound) is contained. This detection is done by, for example, performing the short-time Fourier transform (STFT) on the sound capturing data 505 to thereby generate a spectrogram and then by analyzing whether there are any formants, which are characteristic features of speech. As this process, a process as generally performed in speech signal processing may be employed, and specific description thereof is omitted. If the speech detection unit 202 detects speech, the speech detection unit 202 sets the speech detection flag 503 in the corresponding piece of captured sound channel information 500 to "1". In this embodiment, the speech detection flag 503 indicates that no speech has been detected if set to "0", whereas the speech detection flag 503 indicates that speech has been detected if set to "1". After the speech detection unit 202 finishes its process for all channels, the flow proceeds to S403. The speech detection unit 202 outputs the piece of captured sound channel information 500 on each channel to the inter-channel correlation determination unit 203.

In S403, the inter-channel correlation determination unit 203 determines the degree of similarity (inter-channel correlation value) between any channel in which speech is detected in S402 and the one or more channels adjacent thereto. Details of this process will be described later using FIGS. 6A and 6B.

In S404, on the basis of the inter-channel correlation values determined in S403, the private speech determination unit 204 determines whether private speech is contained in the corresponding channel. Details of this process will be described later using FIG. 8. Note that if private speech is determined to be contained, the private speech flag 504 in the piece of captured sound channel information 500 on the corresponding channel is set to "1". In this embodiment, the private speech flag 504 indicates that private speech is contained if set to "1", whereas the private speech flag 504 indicates that no private speech is contained if set to "0". The private speech determination unit 204 outputs the piece of captured sound channel information 500 on each channel to the speech masking unit 205.

In S405, the speech masking unit 205 performs a speech masking process on the sound capturing data 505 (sound capturing signal) of any channel in which private speech is detected in S404. For example, the speech masking unit 205 generates a masking sound on the basis of the sound capturing data 505 in the piece of captured sound channel information 500 in which private speech is detected and replaces the sound capturing data 505 with the masking sound or combines the masking sound with the sound capturing data 505. Alternatively, the speech masking unit 205 may perform a process of, for example, replacing a preset masking sound with the sound capturing data 505, a process of adding a noise sound, or a process of reducing the sound volume of the sound capturing data 505 of the corresponding channel or muting it. The speech masking unit 205 can also use generally used speech masking processes other than the above.

In S406, the audio signal generation unit 206 mixes the sound capturing signals of the plurality of channels after the speech masking process on any private speech, which have been obtained by the processes up to S405, as appropriate to thereby generate an audio signal in the desired format. Such a process is a process as generally performed in sound reproduction devices, and detailed description thereof is omitted. Note that the sound capturing signals of the plurality of channels may be individually outputted without being mixed.

In S407, the audio signal generation unit 206 determines the output destination for the audio signal generated in S406. The flow proceeds to S408 if the output destination is an sound reproduction device. The flow proceeds to S409 if the output destination is a communication network. The flow proceeds to S410 if the output destination is an external device. The output destination may be set by the user in advance.

In S408, the audio playback unit 208 amplifies the audio signal generated in S406 as appropriate, converts it into an analog signal, and outputs it to the sound reproduction device, such as the speaker array 209, to thereby reproduce the audio sounds. After this process is finished, the flow proceeds to S411.

In S409, the communication unit 210 transmits the audio signal generated in S406 to the communication network 211. The audio sounds can thus be reproduced with an external device connected to the communication network 211. After this process is finished, the flow proceeds to S411.

In S410, the terminal output unit 212 outputs the audio signal generated in S406 to the external device connected to the output terminal. After this process is finished, the flow proceeds to S411.

In S411, the CPU 101 determines whether to terminate the signal processing. If the signal processing is to be terminated, the process of this flowchart is terminated. If the signal processing is not to be terminated, the flow returns to S401, and the processes in the next unit time from the capturing of sounds to the output of an audio signal are repeated.

As described above, any channel in which speech is detected in S402 is subjected to the determination of whether private speech is contained and the masking of such speech. In this way, it is possible to mask only human voice among locally produced sounds. It is therefore possible to generate an audio signal to be reproduced in which the sounds of musical instruments played by spectators, for example, are kept, thereby enhancing the sense of presence, while the sounds of any private conversions between spectators are suppressed. Note that the process in S402 may be omitted, and all channels that have captured sounds may be subjected to the determination of whether private speech is contained and the masking of such speech. This method can also generate an audio signal to be reproduced in which any locally produced sounds are suppressed and also reduce the processing load on the signal processing apparatus 100.

<Determination of Inter-Channel Correlation Value>

FIGS. 6A and 6B are totally a flowchart explaining details of the inter-channel correlation determination process in S403 in this embodiment. Note that the process in FIGS. 6A and 6B is performed by the inter-channel correlation determination unit 203.

In S601, the inter-channel correlation determination unit 203 initializes an inter-channel correlation value list. The inter-channel correlation value list is data in which pieces of inter-channel correlation value information are gathered into a list. Each piece of inter-channel correlation value information stores a correlation value of the pieces of sound capturing data on channels in at least one of which speech is detected. The correlation value of the pieces of sound capturing data is a value indicating the degree of correlation between two sound capturing data spectra, for example. In this embodiment, each piece of inter-channel correlation value information stores the correlation value of the pieces of sound capturing data on channels in at least one of which speech is detected and which are positioned near each other. For example, a piece of inter-channel correlation value information stores the piece of sound capturing data on a first channel in which speech is detected and the piece of sound capturing data on a second channel captured by a second microphone at an adjacent position to the first channel's microphone. The adjacent position means that the first microphone and the second microphone are adjacent to each other, for example, on the assumption that a plurality of microphones are present as illustrated in FIG. 3. Specifically, in this embodiment, the first microphone and the second microphone are considered to be adjacent to each other even in a case where they are far from each other in distance. However, the present invention is not limited to this case. Microphones separated from each other by a predetermined distance or longer may be considered to be not adjacent to each other. Moreover, even in a case where microphones are positioned near each other, those microphones may be considered to be not adjacent to each other if a screening object such as a wall is present between them.

Figure 7:
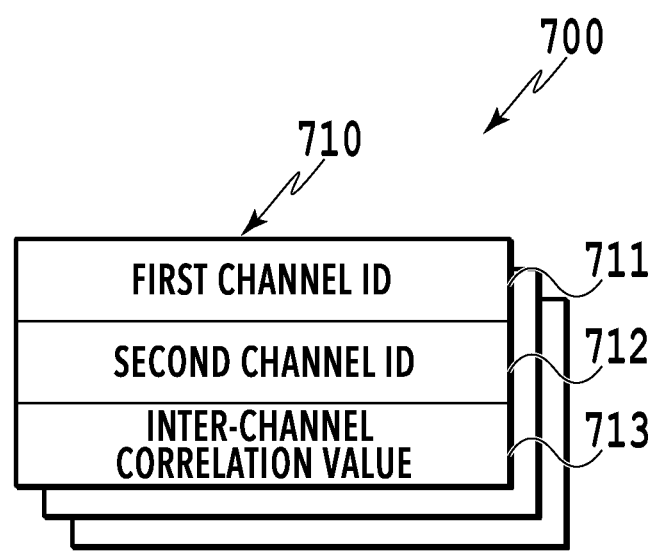
FIG. 7 is a schematic diagram illustrating the data structure of pieces of inter-channel correlation value information.

FIG. 7 is a diagram illustrating an example of an inter-channel correlation value list 700. As illustrated in FIG. 7, each piece of inter-channel correlation value information 710 contains a first channel ID 711, a second channel ID 712, and an inter-channel correlation value 713. Among these, the first channel ID 711 and the second channel ID 712 store IDs of the two respective channels whose the inter-channel correlation value is to be calculated. The inter-channel correlation value 713 stores the peak correlation value determined on the basis of the sound capturing data on the first channel ID 711 and the sound capturing data on the second channel ID 712. In this embodiment, a data structure in which these pieces of inter-channel correlation value information 710 are gathered into a list is referred to as the inter-channel correlation value list 700.

The processes in S602 to S613 are a loop process performed for all sound capturing channels. Specifically, the inter-channel correlation determination unit 203 determines a processing target piece of captured sound channel information from among the pieces of captured sound channel information yet to be processed, and performs the processes in S602 to S613 on it. The inter-channel correlation determination unit 203 repeats the processes until the processes are finished for all sound capturing channels.

In S603, on the basis of the speech detection flag 503 in the processing target piece of captured sound channel information 500, the inter-channel correlation determination unit 203 determines whether speech is detected in the processing target sound capturing channel (hereinafter referred to as the processing target channel). In this embodiment, in the case where the value of the speech detection flag 503 is "1", speech has been detected in the processing target channel. Thus, if the value of the speech detection flag 503 is "1", the flow proceeds to S604. If the value of the speech detection flag 503 is "0", no speech has been detected in the processing target channel, and the flow therefore proceeds to S613 to terminate the processing for the processing target channel. Then, if there are sound capturing channels yet to be processed, the flow returns to S602, a processing target channel is determined from among the sound capturing channels yet to be processed, and the processes are repeated.

In S604, the inter-channel correlation determination unit 203 searches the channel position data held in the channel position data holding unit 207 and identifies the channels at sound capturing positions near the sound capturing position of the processing target channel. In this embodiment, the inter-channel correlation determination unit 203 identifies the channels at the sound capturing positions adjacent to the sound capturing position of the processing target channel (hereinafter referred to as the adjacent channels) as the channels at the sound capturing positions near the sound capturing position of the processing target channel. The processes in S605 to S612 are performed as a loop process for the adjacent channels identified in S604. For example, in a case where a first channel and a second channel are identified as the adjacent channels, the inter-channel correlation determination unit 203 individually performs the processes for the first channel as one adjacent channel and the processes for the second channel as the other adjacent channel.

In S606, the inter-channel correlation determination unit 203 refers to the piece of captured sound channel information 500 on the currently processed adjacent channel and determines whether speech has been detected in the adjacent channel. If speech has been detected, that is, if the value of the speech detection flag 503 of the adjacent channel is "1", the flow proceeds to S607. If no speech has been detected, that is, if the value of the speech detection flag is "0", the flow proceeds to S612 to terminate the processing for the currently processed adjacent channel. Then, if there is an adjacent channel yet to be processed among the adjacent channels identified in S604, this adjacent channel yet to be processed is set as the processing target adjacent channel, and the flow proceeds to S606. If the processes have been performed for all adjacent channels identified in S604, the flow proceeds to S613.

In S607, the inter-channel correlation determination unit 203 determines whether there is a piece of inter-channel correlation value information 710 for the combination of the processing target channel and the adjacent channel in the inter-channel correlation value list 700. If there is already one for the channel combination, the subsequent processes would be redundant processes, and the flow therefore proceeds to S612 to terminate the processing for the currently processed adjacent channel. If there is none for the combination, the flow proceeds to S608.

In S608, the inter-channel correlation determination unit 203 obtains the distance between the microphones that captured the sounds for the processing target channel and the adjacent channel from the pieces of captured sound channel information 500 on these respective channels. For example, the inter-channel correlation determination unit 203 obtains the distance between the microphones by calculating it from the microphone coordinates 502 in the pieces of captured sound channel information 500.

In S609, the inter-channel correlation determination unit 203 determines a time range for calculating the correlation value, on the basis of the distance between the microphones obtained in S608. For example, assume that the length of a processing unit is 1 [sec], the distance between the microphones is r [m], and the time range for calculating the inter-channel correlation is t [sec]. There is a possibility that the microphones have at most as large a time gap as the distance delay therebetween. Thus, the time range t is calculated as in equation (1).

$$T = l + r/C \quad (1)$$

where C is the speed of sound and is 340 m/sec at normal temperature.

In S610, on the basis of the time range determined in S609, the inter-channel correlation determination unit 203 expands the time range for each of the sound capturing signals of the two channels by using sound capturing signals in the last processing in an RAM (not illustrated) inside the inter-channel correlation determination unit 203. The sound capturing signals in the last processing are sound capturing signals captured for a given length of time determined in advance described in S401 in FIG. 4. In other words, they are sound capturing signals captured in the process in S401 in the last round. In this embodiment, as described later, the correlation value between the two channels is calculated, on the basis of which it is determined whether the same speech has been captured by the respective microphones. Here, there can be a gap between the times at which the microphones capture the same speech, the gap corresponding to the distance between the microphones. Thus, in S610, the inter-channel correlation determination unit 203 performs the process of determining the time range for calculating the inter-channel correlation in accordance with the distance between the microphones. In other words, the inter-channel correlation determination unit 203 determines the correlation value of the sound capturing signals captured by the microphones in a period of time whose length is determined in accordance with the distance between the microphones. Thus, in this embodiment, the inter-channel correlation determination unit 203 performs the process of determining the inter-channel correlation value taking into account the delay due to the distance between the microphones that captured the sounds for the two channels.

In S611, the inter-channel correlation determination unit 203 determines the inter-channel correlation value between the processing target channel and the adjacent channel. Specifically, the inter-channel correlation determination unit 203 determines the correlation value between the sound capturing signals in the respective time ranges expanded in S610. The inter-channel correlation value is a value indicating the correlation between the sound capturing signal of the processing target channel and the sound capturing signal of the adjacent channel and can be calculated using a publicly known method. For example, the correlation value can be calculated by dividing the covariance of the two sound capturing signals by the standard deviation of each sound capturing signal. The maximum value of the correlation value is 1, and the higher the correlation, the closer the correlation value is to 1. The inter-channel correlation determination unit 203 stores the peak correlation value in the inter-channel correlation value list 700. Specifically, the inter-channel correlation determination unit 203 generates a piece of inter-channel correlation value information 710 storing the processing target channel as the first channel ID 711, the adjacent channel as the second channel ID 712, and the determined peak correlation value as the inter-channel correlation value 713. Then, the inter-channel correlation determination unit 203 adds this piece of inter-channel correlation value information 710 to the inter-channel correlation value list 700. Note that the adjacent channel's ID may be stored as the first channel ID 711 and the processing target channel's ID may be stored as the second channel ID 712. As described above, pieces of inter-channel correlation value information 710 on channel combinations whose correlation values are determined are stored as a list in the inter-channel correlation value list 700. The flow then proceeds to S612. As mentioned earlier, if the processes are finished for all adjacent channels, the loop process in S605 to S612 is terminated.

In S613, as mentioned earlier, if the processes in which all sound capturing channels are the processing target channels are finished, the loop process in S602 to S613 is terminated.

In S614, the inter-channel correlation determination unit 203 stores the sound capturing signals of all channels into an RAM inside the inter-channel correlation determination unit 203 for the processing in the next processing unit time. In S615, the inter-channel correlation determination unit 203 outputs the inter-channel correlation value list 700 generated by the processing up to this point to the private speech determination unit 204 along with the piece of captured sound channel information 500 on each channel, and then terminates the inter-channel correlation determination process.

In the above description, the sound capturing signals of a plurality of channels are compared with each other to determine their correlation value. Note however that the method of determining the correlation value is not limited to this. The correlation value may be determined using audio signals based on sounds captured at a plurality of sound capturing positions. For example, a speech signal of human voice may be extracted from each of the sound capturing signals of a plurality of channels, and the plurality of speech signals thus extracted may be compared with each other to determine the correlation value between the channels. This method enables more accurate determination of whether the same speech is contained in the sound capturing signals of a plurality of channels.

<Private Speech Determination Process>

Figure 8:
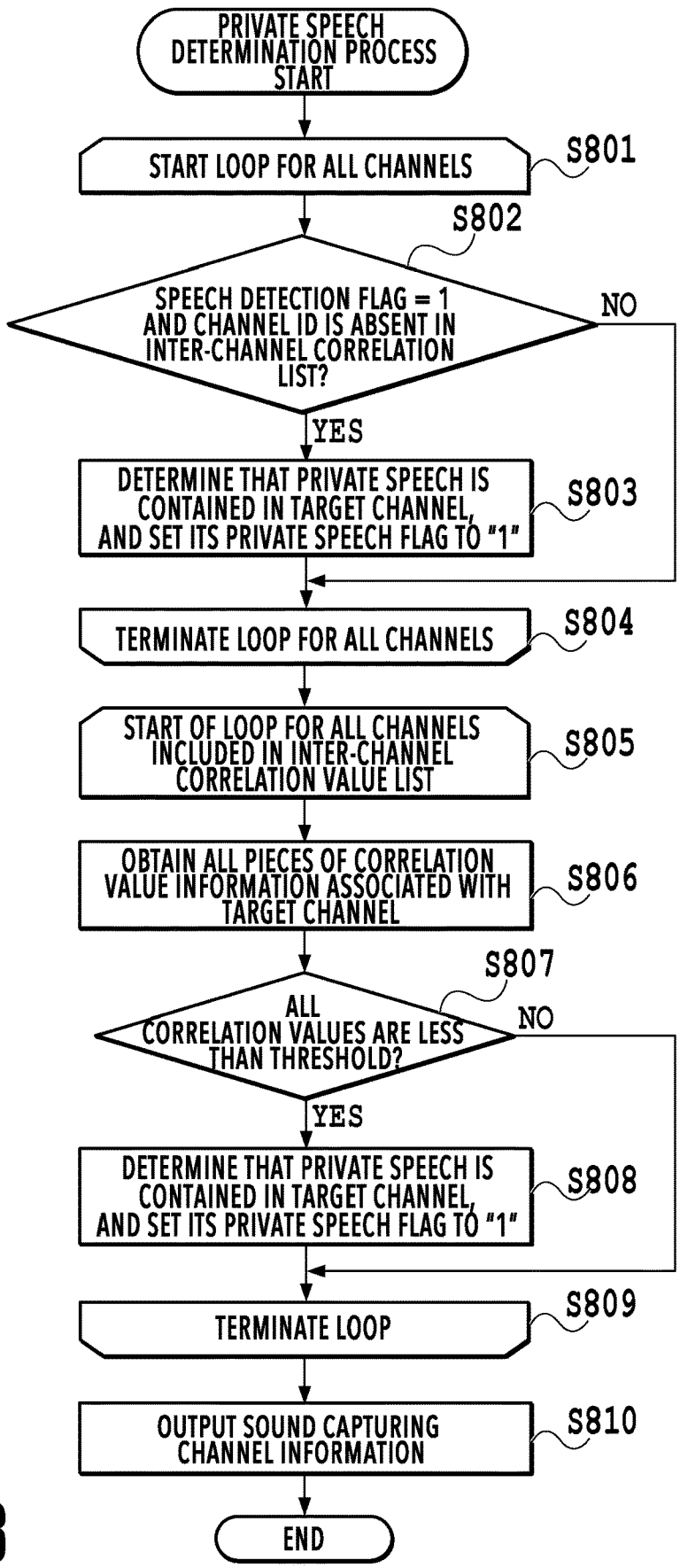
FIG. 8 is a flowchart illustrating a private speech determination process.

FIG. 8 is a detailed flowchart of the private speech determination process in S404 in this embodiment. Note that the process in this flowchart is performed by the private speech determination unit 204.

The processes in S801 to S804 are a loop process performed for all sound capturing channels. In other words, a channel to be processed (processing target channel) is determined from among all sound capturing channels, and the processes in S801 to S804 are performed on it. Then, a processing target channel is determined from among the sound capturing channels yet to be processed, and the processes are repeated.

In S802, the private speech determination unit 204 determines whether speech has been detected in the processing target channel and also no speech has been detected in any of the sound capturing channels captured by the microphones positioned near the processing target channel. Specifically, the private speech determination unit 204 determines whether the value of the speech detection flag 503 in the piece of captured sound channel information 500 on the processing target channel is "1" and also the channel ID 501 is not included in the inter-channel correlation value list 700. If so, the flow proceeds to S803. If not, the flow proceeds to S804 to terminate the processing for this processing target channel. With a channel yet to be processed as the processing target channel, the processes from S801 are repeated.

In S803, the private speech determination unit 204 sets the value of the private speech flag 504 in the piece of captured sound channel information 500 on the processing target channel to "1". Specifically, in S803, the private speech determination unit 204 determines that private speech is contained in the processing target channel. In sum, if speech has been detected in the processing target channel while no speech has been detected in any of the other channels for the microphones at positions near (e.g. adjacent to) the processing target channel, the speech is determined as private speech. The sound of a shout is likely to be captured by microphones at a plurality of positions. In contrast, private speech is unlikely to be captured by microphones at a plurality of positions since its sound volume is lower than the sound of a shout. For this reason, if the channel ID 501 of the processing target channel is not included in the inter-channel correlation value list 700, the private speech determination unit 204 determines that the speech in the processing target channel is private speech. In this embodiment, in the case where the value of the private speech flag 504 is "1", private speech is assumed to be contained. In S804, the private speech determination unit 204 checks whether the processes are finished for all channels. If so, the loop process is terminated.

The next processes in S805 to S810 are a loop process performed for all channels included in the inter-channel correlation value list 700 transmitted from the inter-channel correlation determination unit 203. In other words, the processes in S805 to S810 are not performed for any of the channels not included in the inter-channel correlation value list 700. Each of the channels included in the inter-channel correlation value list 700 is as follows. Speech has been detected in the channel and any of the channels adjacent thereto, and the channel has a value stored as the inter-channel correlation value 713 between itself and the adjacent channel. The processes in S805 to S810 are processes repeated for each of channels yet to be processed as processing target channels among the channels included in the inter-channel correlation value list 700.

In S806, the private speech determination unit 204 searches the entire inter-channel correlation value list and obtains the pieces of inter-channel correlation value information 710 in which the processing target channel is listed. Then, in S807, the private speech determination unit 204 determines whether all of the inter-channel correlation values 713 (peak correlation values) listed in the pieces of inter-channel correlation value information 710 captured in S806 are less than a predetermined threshold. If even one of the inter-channel correlation values 713 is more than or equal to the threshold, it means that a similar speech signal has been captured by another microphone. Thus, the private speech determination unit 204 determines that no private speech is contained in the processing target channel. Then, the flow proceeds to S809 to terminate the processing for this target channel.

On the other hand, if all of the correlation values are less than the threshold, it means that no similar speech signal has been captured by the other microphones. Thus, the flow proceeds to S808, in which the private speech determination unit 204 determines that private speech is contained in the processing target channel. Then, the private speech determination unit 204 sets the private speech flag 504 in the piece of captured sound channel information 500 on the processing target channel to "1". Note that the threshold for the correlation values may be set on the basis of a user operation on the signal processing apparatus 100 or set automatically on the basis of previously captured sounds or the like.

In S809, the private speech determination unit 204 checks whether the processes for all channels included in the inter-channel correlation value list 700 are finished. If so, the loop is terminated. In S810, the private speech determination unit 204 outputs the pieces of captured sound channel information 500 on the channels storing the results of the private speech detection by the processes up to this point to the speech masking unit 205.

As described above, in this embodiment, in the case where speech is detected in both of the channels of microphones positioned near each other, a process is performed to distinguish whether the speech is the sound of a shout, which can be used to reproduce the sense of presence, or private speech. Specifically, in the case where the inter-channel correlation value between the channels of the microphones positioned near each other is less than a predetermined threshold, the speech has been captured by only one of the microphones. Thus, it is determined that private speech is contained. On the other hand, in the case where the inter-channel correlation value is more than or equal to the predetermined threshold, the speech has been captured by both microphones. Thus, the speech can be determined as the sound of a shout. Also in the case where speech is detected only in the channel of one of the microphones positioned near each other, the speech has been captured by only the one of the microphones. Thus, it is determined that private speech is contained. As described above, with the processing in this embodiment, in a venue such as a sports venue, it is possible to keep the sounds of shouts, which can be used to reproduce the sense of presence, while suppressing private speech between spectators.

Note that in this embodiment, description has been given of a case where sound capturing signals are processed in real time. However, the sound capturing signals may be temporarily stored in an external storage medium or the like and processed some time later. Also, in this embodiment, the correlation value between adjacent channels is calculated, on the basis of which whether private speech is contained is determined. However, the correlation value may be calculated between channels that are not adjacent to each other but are within a given distance (predetermined range).

Embodiment 2

In embodiment 1, description has been given of a mode in which whether private speech is contained is determined using the correlation value of sound capturing channels as the degree of their similarity. In this embodiment, description will be given of a mode using the results of speech recognition on sound capturing channels as the degree of similarity between the channels. Note that description of the identical or similar features to those in embodiment 1 will be omitted.

Figure 9:
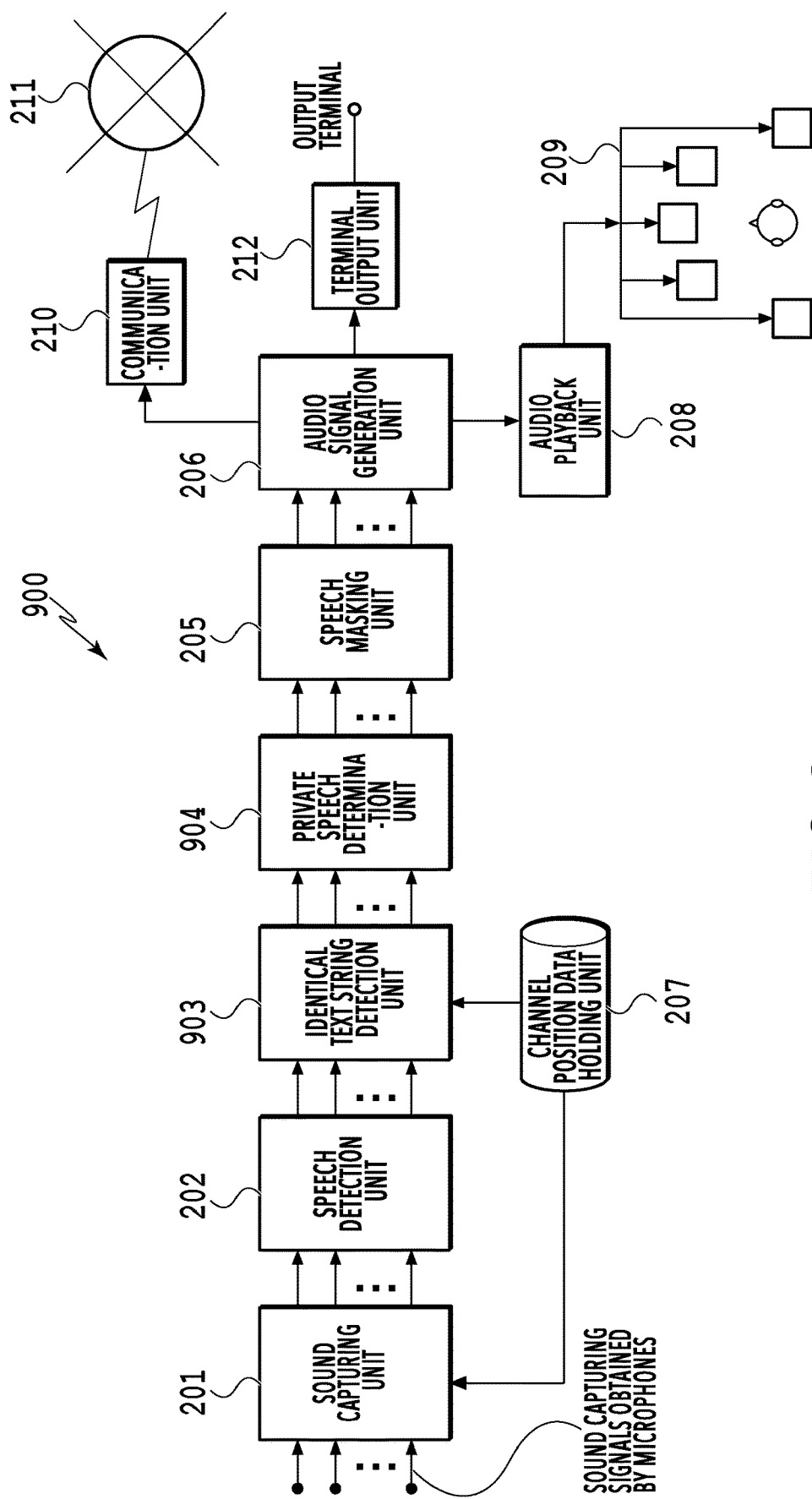
FIG. 9 is a block diagram of a signal processing system.

FIG. 9 is a block diagram of a signal processing system 900 that performs the signal processing in this embodiment. The signal processing system 900 in FIG. 9 includes an identical text string detection unit 903 in place of the inter-channel correlation determination unit 203 of the signal processing system 200 in FIG. 2. Also, the process by a private speech determination unit 904 differs from that in embodiment 1. The other constituent components are similar to those in the signal processing system 200 in FIG. 2, described in embodiment 1, and description thereof is therefore omitted.

The identical text string detection unit 903 performs speech recognition on the speech signal in each input channel in which speech is detected. Also, the identical text string detection unit 903 determines whether an identical text string is contained in channels whose microphone installation positions are near each other, and outputs the result of the determination to the private speech determination unit 904. On the basis of the result of the determination, the private speech determination unit 904 determines whether private speech is contained in any of the channels.

Figure 10:
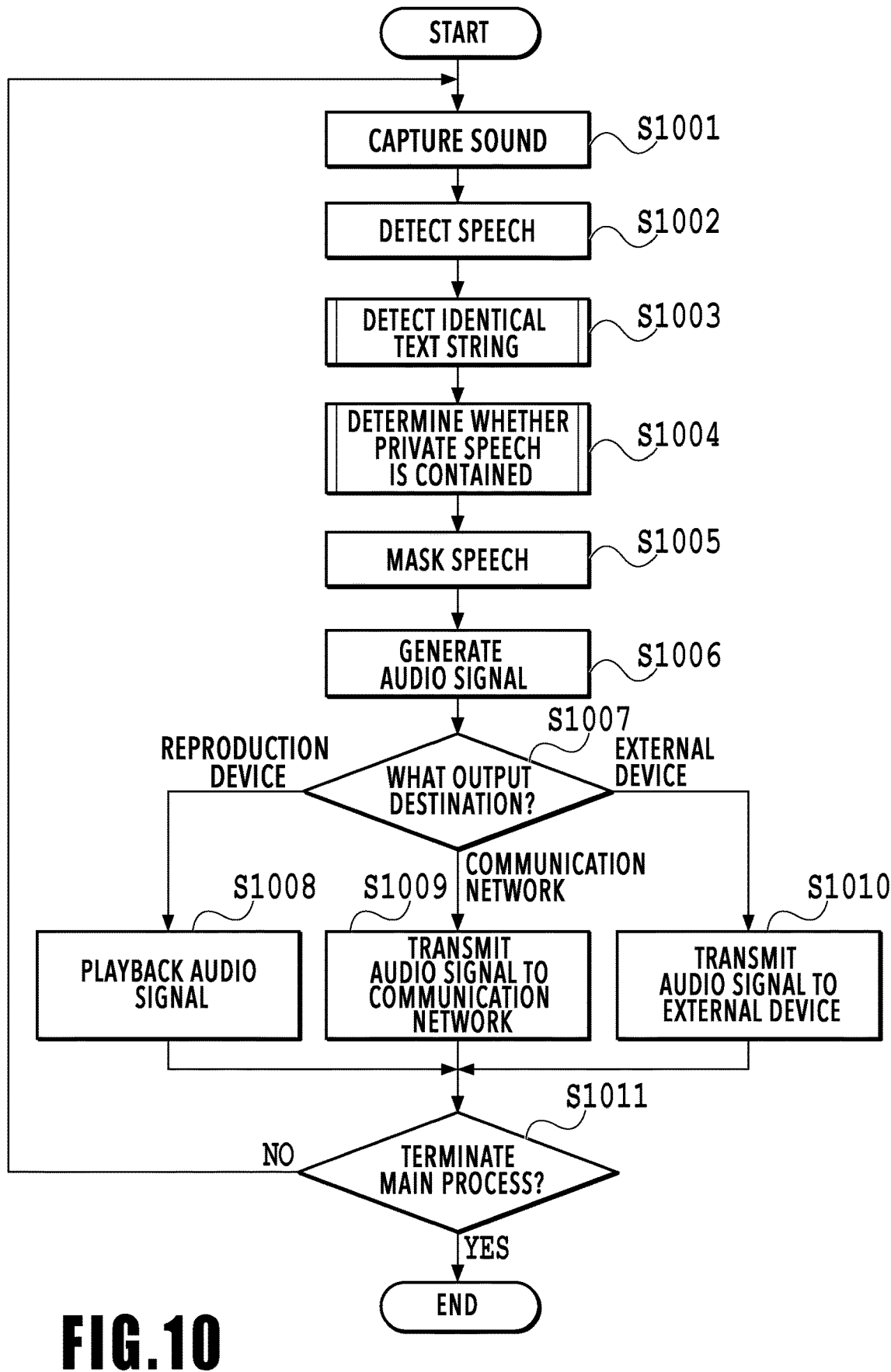
FIG. 10 is a flowchart illustrating signal processing.

FIG. 10 is a flowchart illustrating the main process in this embodiment. S1001 and S1002 in FIG. 10 are similar to S401 and S402 in FIG. 4 in embodiment 1 and description thereof is therefore omitted.

In S1003, the identical text string detection unit 903 performs speech recognition on channels in which speech has been detected, and determines whether an identical text string is contained in channels whose microphone installation positions are near each other. Details of this process will be described later using FIGS. 11A through 11C. After this process is finished, the flow proceeds to S1004.

In S1004, the private speech determination unit 904 determines, for each of the above sound capturing channels, whether private speech is contained in the sound capturing channel by using the result of the identical text string determination, made in S1003. Details of this process will be described later using FIG. 13.

The remaining processes in S1005 to S1011 are similar to S405 to S411 in FIG. 4 in embodiment 1 and description thereof is therefore omitted.

Figure 11A:
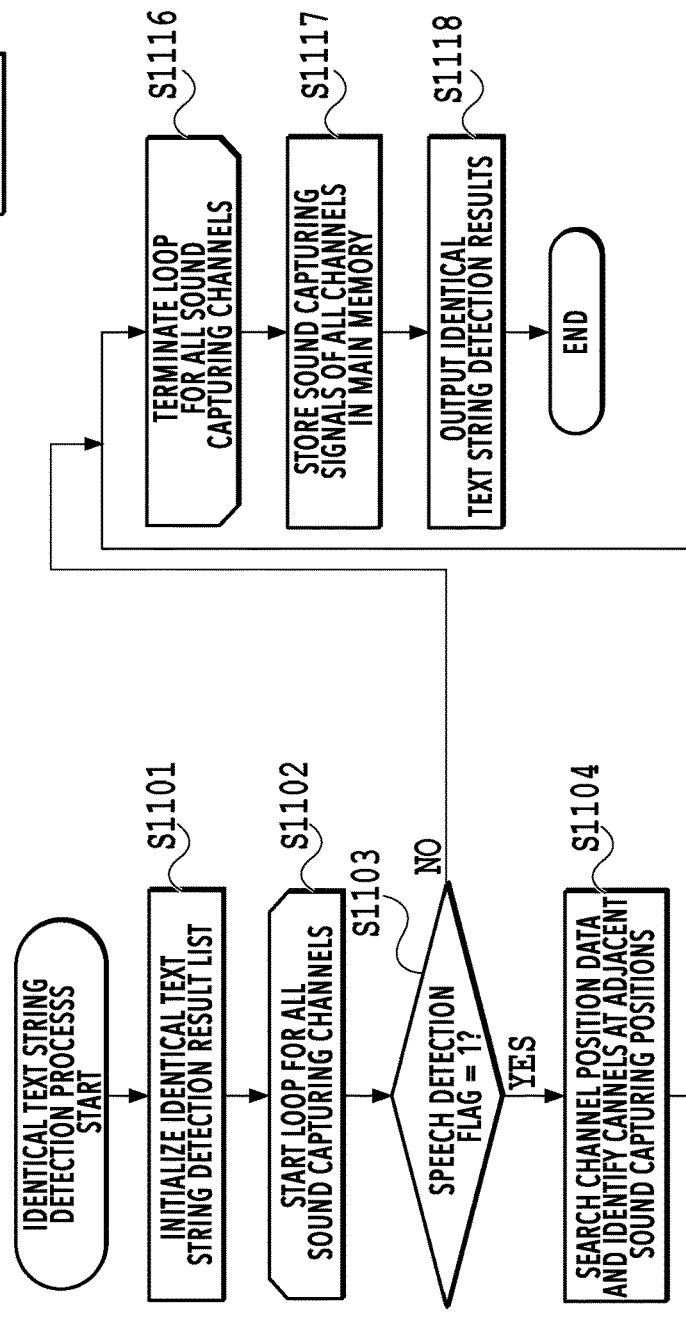
FIGS. 11A through 11C are totally a flowchart illustrating an identical text string detection process.
Figure 11B:
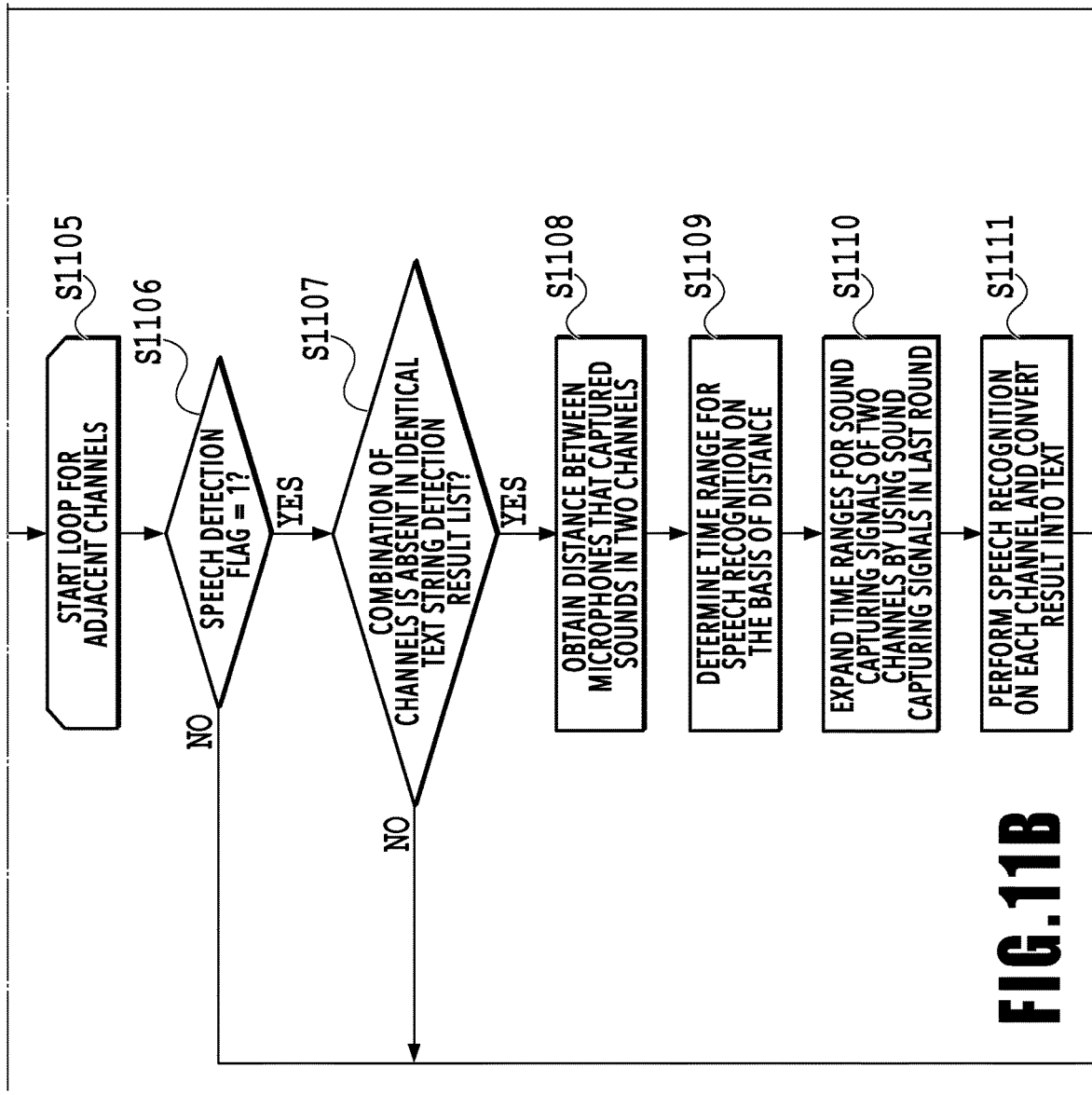
Figure 11C:
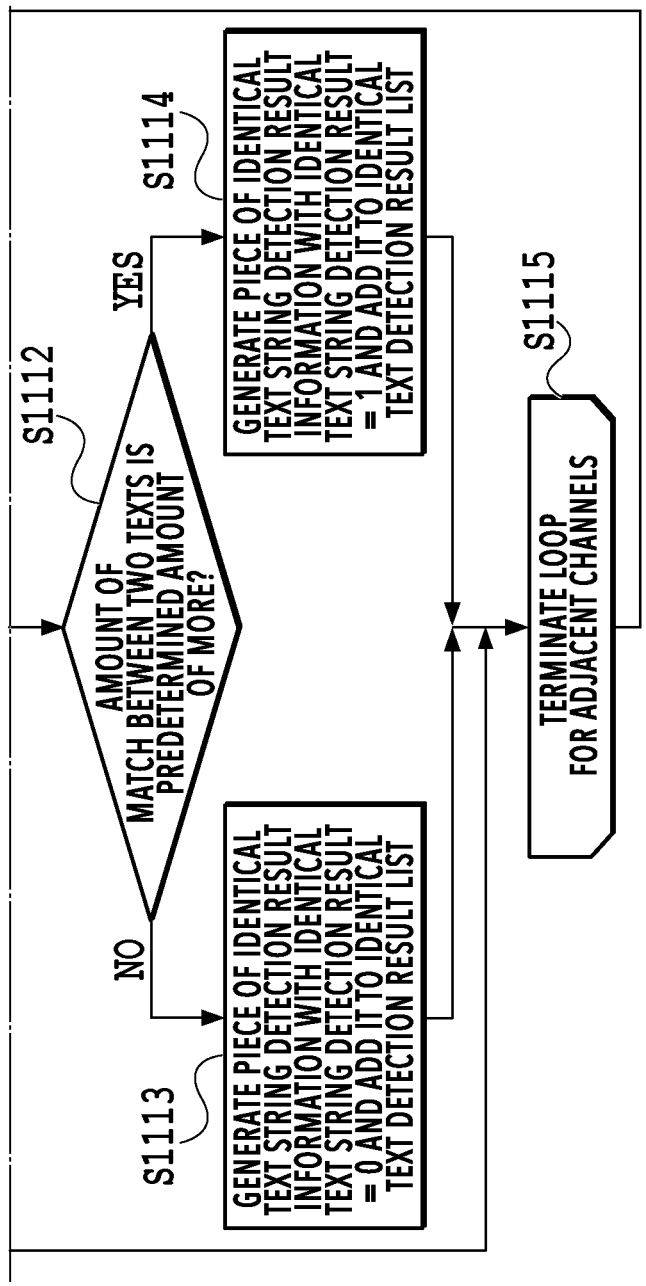

FIGS. 11A through 11C are totally a flowchart of the identical text string detection process in S1003 in this embodiment. Note that the process in this flowchart is executed by the identical text string detection unit 903. Also, the process in this flowchart includes similar processes to those in the flowchart of the inter-channel correlation determination process in FIGS. 6A and 6B in embodiment 1, and detailed description of the similar processes to those in the flowchart in FIGS. 6A and 6B is omitted.

In S1101, the identical text string detection unit 903 initializes an identical text string detection result list. The identical text string detection result list is data in which pieces of identical text string detection result information are gathered into a list. A piece of identical text string detection result information is information on a channel signal in which speech has been detected, indicating whether the same identical text string is present in two channels positioned near each other.

Figure 12:
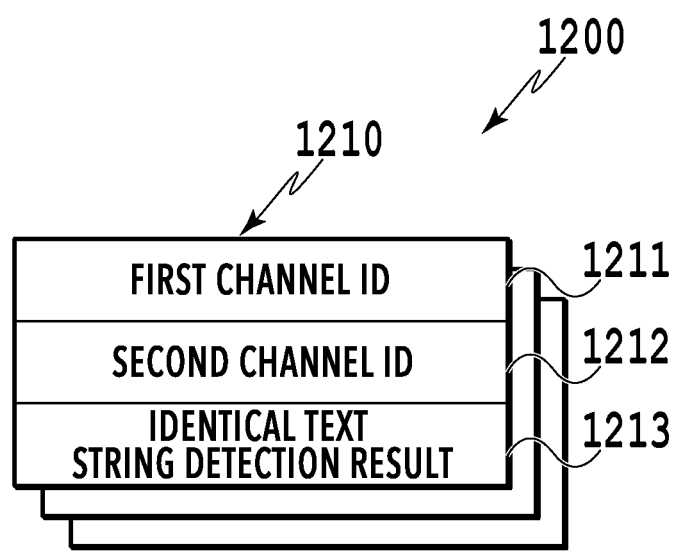
FIG. 12 is a schematic diagram illustrating the data structure of pieces of identical text string detection result information.

FIG. 12 is a diagram illustrating an example of an identical text string detection result list 1200. As illustrated in FIG. 12, each piece of identical text string detection result information 1210 contains a first channel ID 1211, a second channel ID 1212, and an identical text string detection result 1213. Among these, the first channel ID 1211 and the second channel ID 1212 store IDs of two respective channels which are positionally adjacent to each other and are to be subjected to speech recognition. Also, the identical text string detection result 1213 stores information indicating whether the same identical text string is present in the two channels, based on the result of the speech recognition on the first channel ID 1211 and the second channel ID 1212.

The processes in S1102 to S1116 are a loop process performed for all sound capturing channels. Specifically, the identical text string detection unit 903 determines a processing target piece of captured sound channel information from among the pieces of captured sound channel information yet to be processed, and performs the processes in S1102 to S1116 on it. The identical text string detection unit 903 repeats the processes until the processes are finished for all sound capturing channels.

By reading the inter-channel correlation value list in FIGS. 6A and 6B as the identical text string detection result list, the processes in S1103 to S1110 are substantially the same as the processes in S603 to S610 in FIGS. 6A and 6B in embodiment 1, and description thereof is therefore omitted.

In S1111, the identical text string detection unit 903 performs a speech recognition process on the processing target channel and the adjacent channel with their time ranges expanded in S1110. The identical text string detection unit 903 temporarily stores the two text strings obtained as the result of the speech recognition process in an RAM (not illustrated) inside the identical text string detection unit 903. Note that in this embodiment, the speech recognition result is provided in the form of text using phonograms regardless of the language. However, the form of the result of the speech recognition process is not limited to this.

In S1112, the identical text string detection unit 903 determines whether the amount of match between the two text strings obtained in S1111 is a predetermined amount or more. Specifically, the identical text string detection unit 903 determines whether the degree of match between the two text strings is more than or equal to a predetermined threshold. This threshold may be set on the basis of a user operation or set automatically on the basis of previous speech recognition results or the like. In this embodiment, taking into account false recognition in the speech recognition and the presence of large ambient noise, the identical text string detection unit 903 determines that the two text strings match each other if 80% or more of them are the same. If the identical text string detection unit 903 determines that the text strings do not match each other, the flow proceeds to S1113. If the identical text string detection unit 903 determines that the text strings match each other, the flow proceeds to S1114.

In S1113, the identical text string detection unit 903 generates a piece of identical text string detection result information 1210 storing the two processing target channel IDs and the identical text string detection result (=0) and adds it to the identical text string detection result list 1200. On the other hand, in S1114, the identical text string detection unit 903 generates a piece of identical text string detection result information 1210 storing the two processing target channel IDs and the identical text string detection result (=1) and adds it to the identical text string detection result list 1200. In this embodiment, in the case where the value of the identical text string detection result indicates "1", it indicates a result where the two text strings match each other. After the process in S1113 or S1114 is finished, the flow proceeds to S1115.

By reading the inter-channel correlation value list in FIGS. 6A and 6B as the identical text string detection result list, the processes in S1115 to S1118 are substantially the same as S612 to S615 in FIGS. 6A and 6B in embodiment 1, and description thereof is therefore omitted.

By the identical text string detection process in FIGS. 11A through 11C, an identical text string detection result list is obtained which stores information for each single pair of sound capturing channels positioned near each other, indicating whether their text strings obtained by the speech recognition contain an identical text string.

Figure 13:
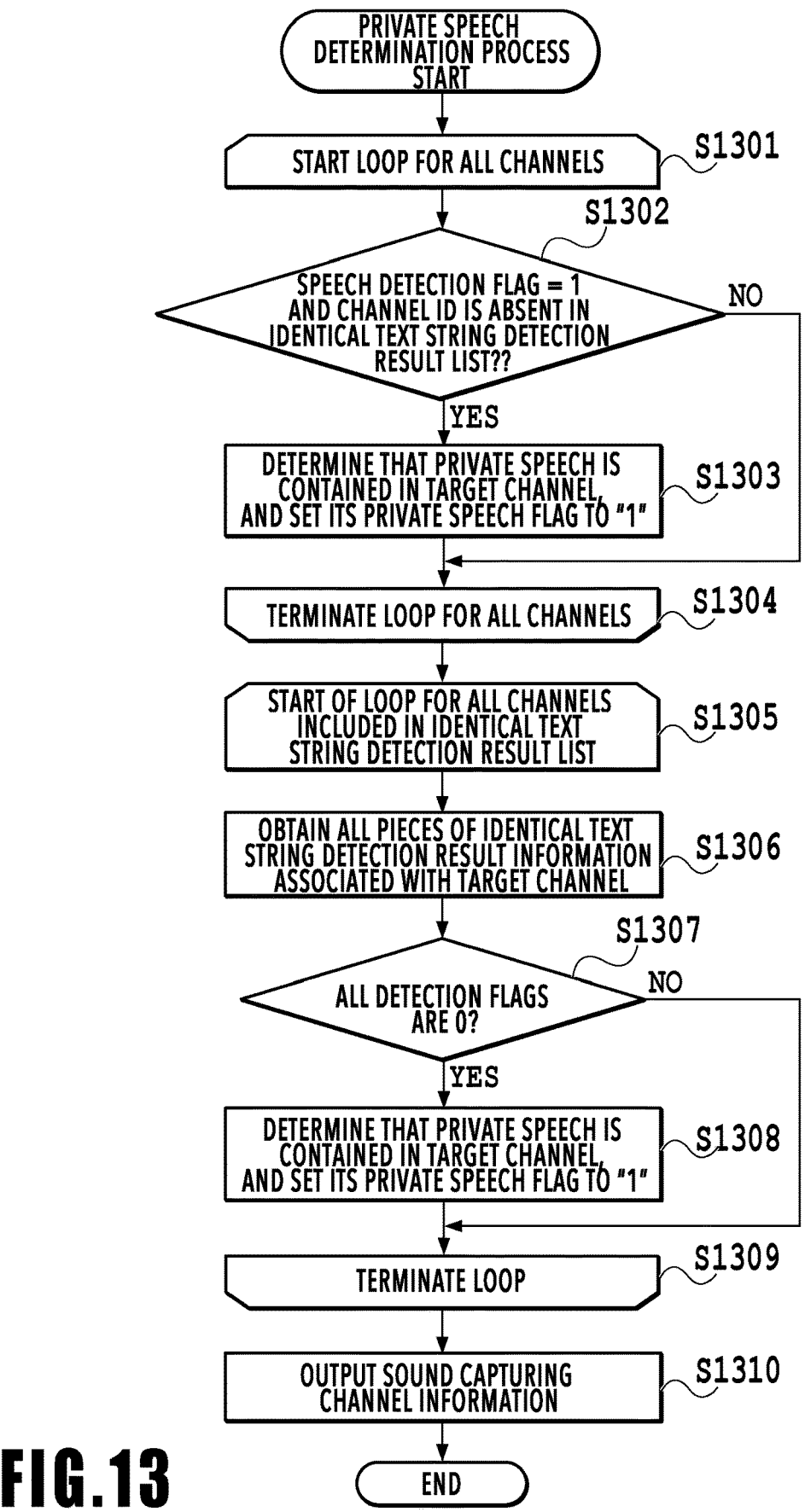
FIG. 13 is a flowchart illustrating a private speech determination process.

FIG. 13 is a detailed flowchart of the private speech determination process in S1004 in this embodiment. Note that the process in this flowchart is executed by the private speech determination unit 904. Also, the process in this flowchart includes similar processes to those in the private speech determination process illustrated in FIG. 8 in embodiment 1, and detailed description of the similar processes to those in FIG. 8 is omitted.

By reading the inter-channel correlation value list in FIG. 8 as the identical text string detection result list, the processes in S1301 to S1306 are substantially the same as the processes in S801 to S806 in FIG. 8, and description thereof is therefore omitted.

In S1307, the private speech determination unit 904 determines whether the values of all pieces of identical text string detection result information captured in S1306 are "0". If the values of all pieces of identical text string detection result information are "0", the flow proceeds to S1308. In S1308, the private speech determination unit 904 determines that private speech is contained in the processing target channel, and sets the value of the private speech flag 504 in the piece of captured sound channel information 500 on the processing target channel to "1". If not all detection flags have a value of "0", the flow proceeds to S1309. S1309 and S1310 are similar to S809 and S810 in FIG. 8 and description thereof is therefore omitted.

As described above, in this embodiment, a speech recognition process is performed on each channel in which speech is detected to thereby convert the speech into text. Then, it is determined whether an identical text string is present in channels close to each other in distance. Any channel containing a text string that is not identical to any of the channels close to it in distance is determined as a channel containing private speech. In this way, in a venue such as a sports venue, it is possible to maintain the sounds of shouts, which can be used to reproduce the sense of presence, while suppressing private speech between spectators.

OTHER EMBODIMENTS

In embodiments 1 and 2, description has been given taking as an example a mode in which whether private speech is contained is determined in the same manner for all sound capturing channel signals. However, the present invention is not limited to this mode. To reduce the load of the private speech determination process, the private speech determination method may be changed in accordance with how the microphones are installed. Consider, for example, a case where the microphone installation intervals in a sports venue change from one spectator stand area to another on the basis of characteristics of the sports venue and/or characteristics of the sport itself. At an area where the microphone installation intervals are wider than a predetermined threshold, even sounds of a shout captured by the microphones are not similar to each other in some cases. For example, in a soccer venue, microphones installed in front of the center of the main stand and microphones installed behind a goal at installation intervals greater than a predetermined threshold do not capture the same sound. In such a case, the inter-channel processing may be omitted for the area with installation intervals greater than the predetermined threshold. Instead, processing may be performed individually on each single channel to determine whether private speech is contained. For example, the speech recognition process may be performed individually on each single channel and, if a particular keyword is detected, the speech may be determined as private speech. Also, on the basis of the shift in sound pressure level of speech or its intonation, whether the speech is a loud voice directed toward something at distance or a conversational voice directed toward a nearby person may be determined to determine whether the speech is private speech. Whether private speech is contained may be determined on the basis of the result of the inter-channel processing described in embodiments 1 and 2, only for the area with microphone installation intervals smaller than the predetermined threshold.

Specifically, assume a case where it is possible to obtain a first set of sound capturing signals (first group of channels) obtained by a first group of microphones at sound capturing positions separated from each other by a first distance, and a second set of sound capturing signals (second group of channels) obtained by a second group of microphones at sound capturing positions separated from each other by a second distance longer than the first distance. In this case, the signal processing apparatus 100 can perform the private speech determination process using the degree of similarity between adjacent channels for each channel included in the first group of channels. On the other hand, the signal processing apparatus 100 does not perform the private speech determination process using the degree of similarity between adjacent channels for each channel included in the second group of channels. Instead, the signal processing apparatus 100 can perform a private speech determination process individually on each single channel. In a case where private speech is determined to be contained in a channel as a result of the private speech determination process performed individually on each single channel, the above-described masking process is executed on that channel.

Also, embodiments 1 and 2 have been described taking as an example a mode in which the channels of microphones installed adjacent to each other are used to determine whether private speech is contained. However, the microphones may just need to be positioned near each other within a predetermined range, and are not limited to ones adjacent to each other. Assume, for example, a case where three microphones are installed in a predetermined range as a first microphone, a second microphone, and a third microphone in this order. In this case, there can be a situation where a shout is captured by the first microphone and the second microphone and also a situation where a shout is captured by the first microphone and the third microphone. Hence, the channels of microphones installed adjacent to each other do not necessarily have to be used to determine whether private speech is contained.

Also, in embodiments 1 and 2, description has been given of a mode in which the degree of similarity between two adjacent channels is determined. However, the degree of similarity between three adjacent channels may be determined. Assume, for example, a case where three microphones are installed in a predetermined range as a first microphone, a second microphone, and a third microphone in this order. In this case, there can be a situation where a shout is captured by all of the first microphone, the second microphone, and the third microphone. Hence, the processing described in embodiment 1 or 2 may be performed by determining the degree of similarity between three microphones. Thus, the processing can be performed on the basis of the degree of similarity between at least two channels.

Also, in scenes where shouts in the whole area become intense, even if private speech is uttered, it may be lost in the shouts in the whole area and thus inaudible. Then, the sound pressure from all sound capturing channels together may be measured, and the process of detecting speech itself may be canceled in a case where this sound pressure is more than or equal to a certain threshold. In the case where the speech detection is not performed, none of the channels is subjected to the suppression of private speech.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, it is possible to distinguish and process a sound to be suppressed and a sound not to be suppressed contained in sounds produced and captured from the same area.

This application claims the benefit of Japanese Patent Application No. 2018-090689, filed May 9, 2018, which is hereby incorporated by reference wherein in its entirety.

What is claimed is:

1. A signal processing apparatus comprising:
one or more processors functioning by executing instructions stored in one or more memories as the following units:
a detection unit configured to perform a voice detection process on each of a plurality of sound signals captured by a plurality of microphones arranged at mutually different positions;
a determination unit configured to determine a degree of similarity between two or more of the plurality of sound signals in which voice is detected by the detection unit; and
a control unit configured to cause a suppressing process for suppressing the voice contained in at least one of the two or more of the plurality of sound signals to be performed in a case where a determination that the degree of similarity between the two or more of the plurality of sound signals is less than a threshold is determined by the determination unit, and to cause the suppressing process not to be performed in a case where a determination that the degree of similarity between the two or more of the plurality of sound signals is not less than the threshold is determined by the determination unit.

2. The signal processing apparatus according to claim 1, wherein the two or more of the plurality of sound signals are captured by sound capturing operations performed in a same period of time.

3. The signal processing apparatus according to claim 2, wherein the determination unit determines the degree of similarity between two sound signals captured by two of the microphones through sound capturing operations in a period of time whose length is determined in accordance with a distance between the two microphones.

4. The signal processing apparatus according to claim 3, wherein the determination unit determines the degree of similarity between the two sound signals on a basis of a sound delay corresponding to the distance between the two microphones.

5. The signal processing apparatus according to claim 1, wherein the degree of similarity is a correlation value of spectra of the two or more of the plurality of sound signals.

6. The signal processing apparatus according to claim 1, wherein the determination unit determines the degree of similarity on a basis of a result of a speech recognition process on the two or more of the plurality of sound signals.

7. The signal processing apparatus according to claim 6, wherein the degree of similarity is a degree of match between texts of pieces of speech recognized by the speech recognition process.

8. The signal processing apparatus according to claim 1, wherein the suppressing process is a process for suppressing voice contained in one of the two or more of the plurality of sound signals and not contained in the remaining sound signals.

9. The signal processing apparatus according to claim 1, wherein in a case where voice is detected in the sound signal captured by one of the plurality of microphones and voice is not detected in the sound signal captured by a microphone adjacent to the one microphone, the control unit causes the suppressing process for suppressing the voice contained in the sound signal captured by the one microphone.

10. The signal processing apparatus according to claim 1, wherein the determination unit determines the degree of similarity between two sound signals captured by two of the microphones at adjacent positions.

11. The signal processing apparatus according to claim 1, wherein the one or more processors further functions as a capturing unit configured to capture a first set of sound signals captured by a first group of microphones positioned at an interval shorter than a predetermined distance, and a second set of sound signals captured by a second group of microphones positioned at an interval equal to or longer than the predetermined distance, and
wherein the determination unit determines the degree of similarity for the first set of sound signals and does not determine the degree of similarity for the second set of sound signals.

12. The signal processing apparatus according to claim 11, wherein
the determination unit determines whether to suppress voice contained in the second set of sound signals, on a basis of the second set of sound signals, and
the control unit causes the suppressing process for suppressing the voice contained in the second set of sound signals in a case where that a determination to suppress voice contained in the second set of sound signals is determined by the determination unit.

13. The signal processing apparatus according to claim 1, wherein the one or more processors further functions as a measurement unit configured to measure sound pressure of each of the sound signals, and
wherein the control unit causes the suppressing process for suppressing the voice on a sound signal whose sound pressure measured by the measurement unit is higher than a predetermined value not to be performed.

14. The signal processing apparatus according to claim 1, wherein the one or more processors further function as an output unit configured to output a sound signal subjected to the suppressing process.

15. The signal processing apparatus according to claim 1, wherein the plurality of microphones are arranged around a field in a sports venue.

16. The signal processing apparatus according to claim 1, wherein a plurality of sound signals including a sound signal subjected to the suppressing process are mixed for generating a sound data.

17. A signal processing method comprising:
performing voice detection on each of a plurality of sound signals captured by a plurality of microphones arranged at mutually different positions;
determining a degree of similarity between two or more of the plurality of sound signals in which voice is detected by the voice detection; and
causing a suppressing process for suppressing the voice contained in at least one of the two or more of the plurality of sound signals to be performed in a case where a determination that the degree of similarity between the two or more of the plurality of sound signals is less than a threshold is determined in the determining, and causing the suppressing process not to be performed in a case where a determination that the degree of similarity between the two or more of the plurality of sound signals is not less than the threshold is determined in the determining.

18. The signal processing method according to claim 17, wherein
the two or more of the plurality of sound signals are captured by sound capturing operations performed in a same period of time, and
the determining includes determining the degree of similarity between two sound signals captured by two of the microphones through sound capturing operations in a period of time whose length is determined in accordance with a distance between the two microphones.

19. The signal processing method according to claim 17, wherein the suppressing process is a process for suppressing voice contained in one of the two or more of the plurality of sound signals and not contained in the remaining sound signals.

20. A non-transitory computer readable storage medium storing a program which performs a signal processing method, the method comprising:
performing voice detection on each of a plurality of sound signals captured by a plurality of microphones arranged at mutually different positions;
determining a degree of similarity between two or more of the plurality of sound signals in which voice is detected by the voice detection; and
causing a suppressing process for suppressing the voice contained in at least one of the two or more of the plurality of sound signals to be performed in a case where a determination that the degree of similarity between the two or more of the plurality of sound signals is less than a threshold is determined in the determining, and causing the suppressing process not to be performed in a case where a determination that the degree of similarity between the two or more of the plurality of sound signals is not less than the threshold is determined in the determining.

* * * * *